US010536298B2

(12) United States Patent
Hayashi

(10) Patent No.: US 10,536,298 B2
(45) Date of Patent: Jan. 14, 2020

(54) COMMUNICATION APPARATUS AND METHOD FOR CONTROLLING COMMUNICATION APPARATUS

(71) Applicant: CANON KABUSHIKI KAISHA, Tokyo (JP)

(72) Inventor: Kenichirou Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 14/751,616

(22) Filed: Jun. 26, 2015

(65) Prior Publication Data

US 2015/0378331 A1 Dec. 31, 2015

(30) Foreign Application Priority Data

Jun. 30, 2014 (JP) ................. 2014-135168

(51) Int. Cl.
*H04L 12/64* (2006.01)
*H04L 12/24* (2006.01)

(52) U.S. Cl.
CPC ...... *H04L 12/6418* (2013.01); *H04L 41/0803* (2013.01)

(58) Field of Classification Search
None
See application file for complete search history.

(56) References Cited

U.S. PATENT DOCUMENTS 6,427,198 B1 * 7/2002 Berglund ............ H04L 41/08
710/10

8,695,057 B2 * 4/2014 Fujii ................. H04L 63/105
380/200

(Continued)

FOREIGN PATENT DOCUMENTS

CN 1409529 A 4/2003
CN 103312357 A 9/2013

(Continued)

OTHER PUBLICATIONS

Nov. 1, 2017 Chinese Office Action, which is enclosed with an English Translation, that issued in Chinese Patent Application No. 201510369722.9.

*Primary Examiner* — Jason D Recek
(74) *Attorney, Agent, or Firm* — Cowan, Liebowitz & Latman, P.C.

(57) ABSTRACT

There is provided a communication apparatus having a first communication unit configured to hold a first communication parameter and share the held first communication parameter with an external apparatus, and a second communication unit configured to perform communication with the external apparatus by using the first communication parameter that the first communication unit shares with the external apparatus. A control unit performs control so that communication by the second communication unit is started in response to sharing of the first communication parameter by the first communication unit. When communication by the second communication unit is to be performed in response to sharing of the first communication parameter by the first communication unit, the control unit puts the first communication parameter, which has been shared with the external apparatus, in a state in which it cannot be shared via the first communication unit.

13 Claims, 8 Drawing Sheets

(56) References Cited

U.S. PATENT DOCUMENTS

| | | | | |
|---|---|---|---|---|
| 2003/0198229 A1* | 10/2003 | Ochi | ............... | H04L 12/2854 370/395.4 |
| 2009/0216961 A1* | 8/2009 | Kwon | ............... | G06F 13/1652 711/149 |
| 2010/0077055 A1* | 3/2010 | Cohen | ............... | G06F 3/023 709/213 |
| 2010/0144273 A1 | 6/2010 | Sekikawa et al. | | |
| 2010/0214979 A1* | 8/2010 | Kuehnel | ............... | H04L 41/00 370/328 |
| 2011/0261892 A1 | 10/2011 | Fujii | | |
| 2012/0005500 A1* | 1/2012 | Tamura | ............... | G06F 1/3209 713/320 |
| 2012/0040613 A1* | 2/2012 | Nakano | ............... | H02J 7/025 455/41.1 |
| 2015/0358177 A1* | 12/2015 | Lee | ............... | H04L 12/2834 709/217 |

FOREIGN PATENT DOCUMENTS

| | | |
|---|---|---|
| JP | 2006-287767 A | 10/2006 |
| JP | 2009-124409 A | 6/2009 |
| JP | 2011-087249 A | 4/2011 |
| JP | 2011-229164 A | 11/2011 |

\* cited by examiner

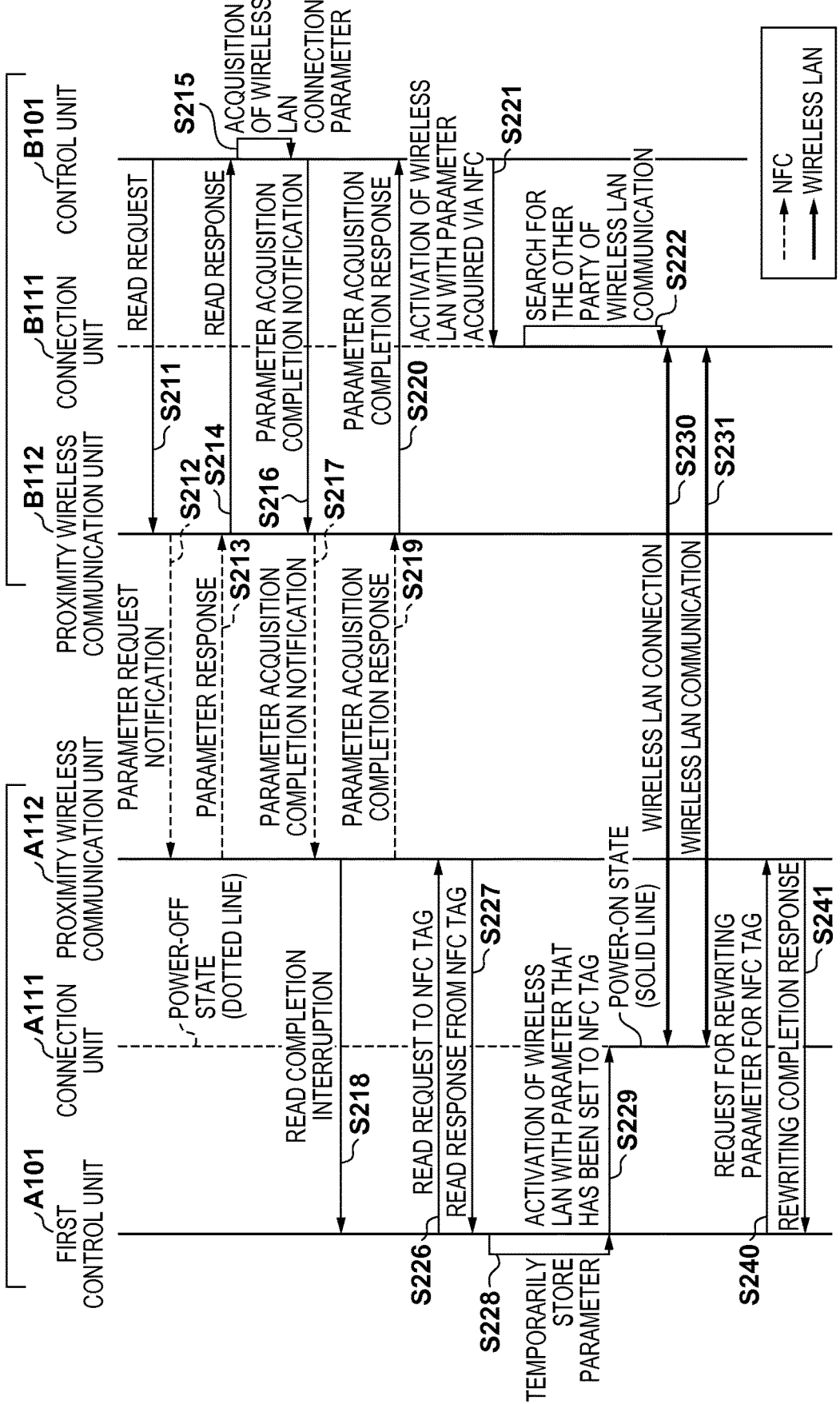

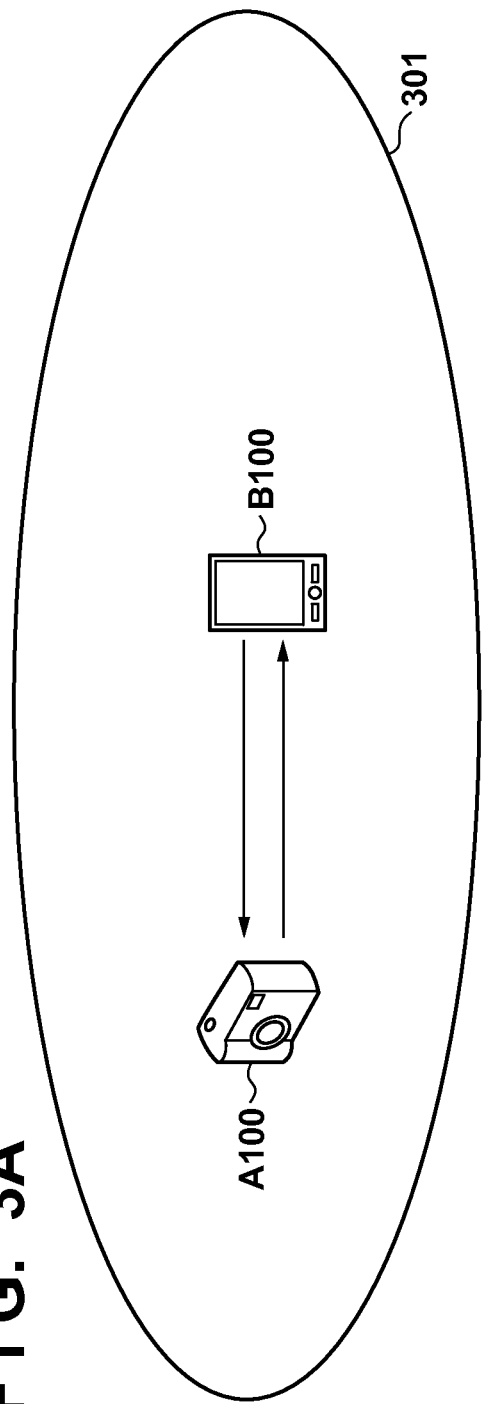
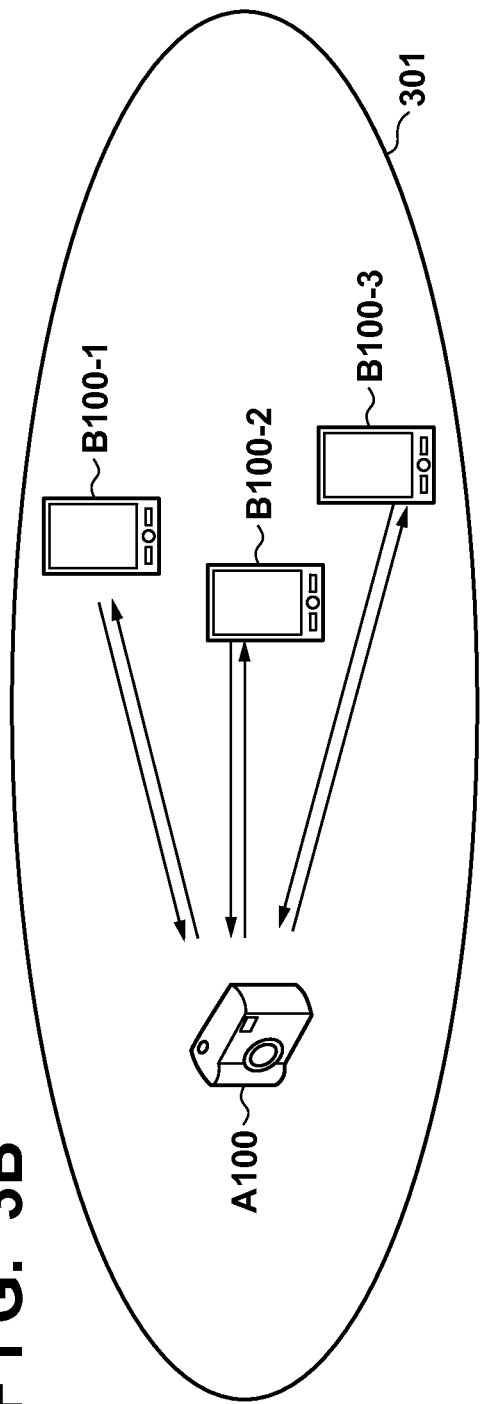

COMMUNICATION APPARATUS AND METHOD FOR CONTROLLING COMMUNICATION APPARATUS

BACKGROUND OF THE INVENTION

Field of the Invention

The present invention relates to a communication apparatus and a method for controlling a communication apparatus.

Description of the Related Art

Regarding communication between two communication apparatuses each having two types of wireless communication functions, a technology is now known of using a first wireless communication function to exchange therebetween a parameter for a second wireless communication function, and thereby achieving easy establishment of wireless connection via the second wireless communication function. For example, Japanese Patent Laid-open No. 2009-124409 discloses that an image capturing apparatus acquires wireless LAN setting information from an access point by using non-contact communication and sets the acquired wireless LAN setting information to a storage unit.

In some cases, it is not desirable that when two communication apparatuses perform wireless communication by using a predetermined parameter, another communication apparatus joins in this wireless communication by using the same parameter. However, in the case of the disclosure of Japanese Patent Laid-open No. 2009-124409, a plurality of image capturing apparatuses can acquire same wireless LAN setting information by performing non-contact communication with an access point, and therefore this disclosure cannot address the aforementioned problem.

SUMMARY OF THE INVENTION

The present invention is made in view of such a situation, and provides technology of suppressing the case where a plurality of communication apparatuses acquire a same parameter for wireless communication.

According to an aspect of the present invention, there is provided a communication apparatus comprising: a first communication unit configured to hold a first communication parameter and share the held first communication parameter with an external apparatus; a second communication unit configured to perform communication with the external apparatus by using the first communication parameter that the first communication unit shares with the external apparatus; and a control unit configured to perform control so that communication by the second communication unit is started in response to sharing of the first communication parameter by the first communication unit, wherein, when communication by the second communication unit is to be performed in response to sharing of the first communication parameter by the first communication unit, the control unit puts the first communication parameter, which has been shared with the external apparatus, in a state in which it cannot be shared via the first communication unit.

According to another aspect of the present invention, there is provided a method for controlling a communication apparatus, the communication apparatus comprising: a first communication unit configured to hold a first communication parameter and share the held first communication parameter with an external apparatus; and a second communication unit configured to perform communication with the external apparatus by using the first communication parameter that the first communication unit shares with the external apparatus, the method comprising performing control so that communication by the second communication unit is started in response to sharing of the first communication parameter by the first communication unit, wherein, in the performing of the control, when communication by the second communication unit is to be performed in response to sharing of the first communication parameter by the first communication unit, the first communication parameter, which has been shared with the external apparatus, is put in a state in which it cannot be shared via the first communication unit.

Further features of the present invention will become apparent from the following description of exemplary embodiments with reference to the attached drawings.

BRIEF DESCRIPTION OF THE DRAWINGS

FIG. 2A is a sequence diagram according to the first embodiment, showing a processing flow from when a digital camera A100 performs proximity wireless communication with a smartphone B100 to when the digital camera A100 establishes wireless LAN communication.

FIG. 3A is a diagram showing one-to-one connection between the digital camera A100 and the smartphone B100.

FIG. 3B is a diagram showing one-to-many connection between the digital camera A100 and the smartphone B100.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

The embodiments described below are exemplary means for realizing the present invention, and may be modified or changed as appropriate, depending on the configuration of the apparatus to which the invention is applied and various conditions. The individual embodiments can also be combined as appropriate.

First Embodiment

Figure 1:
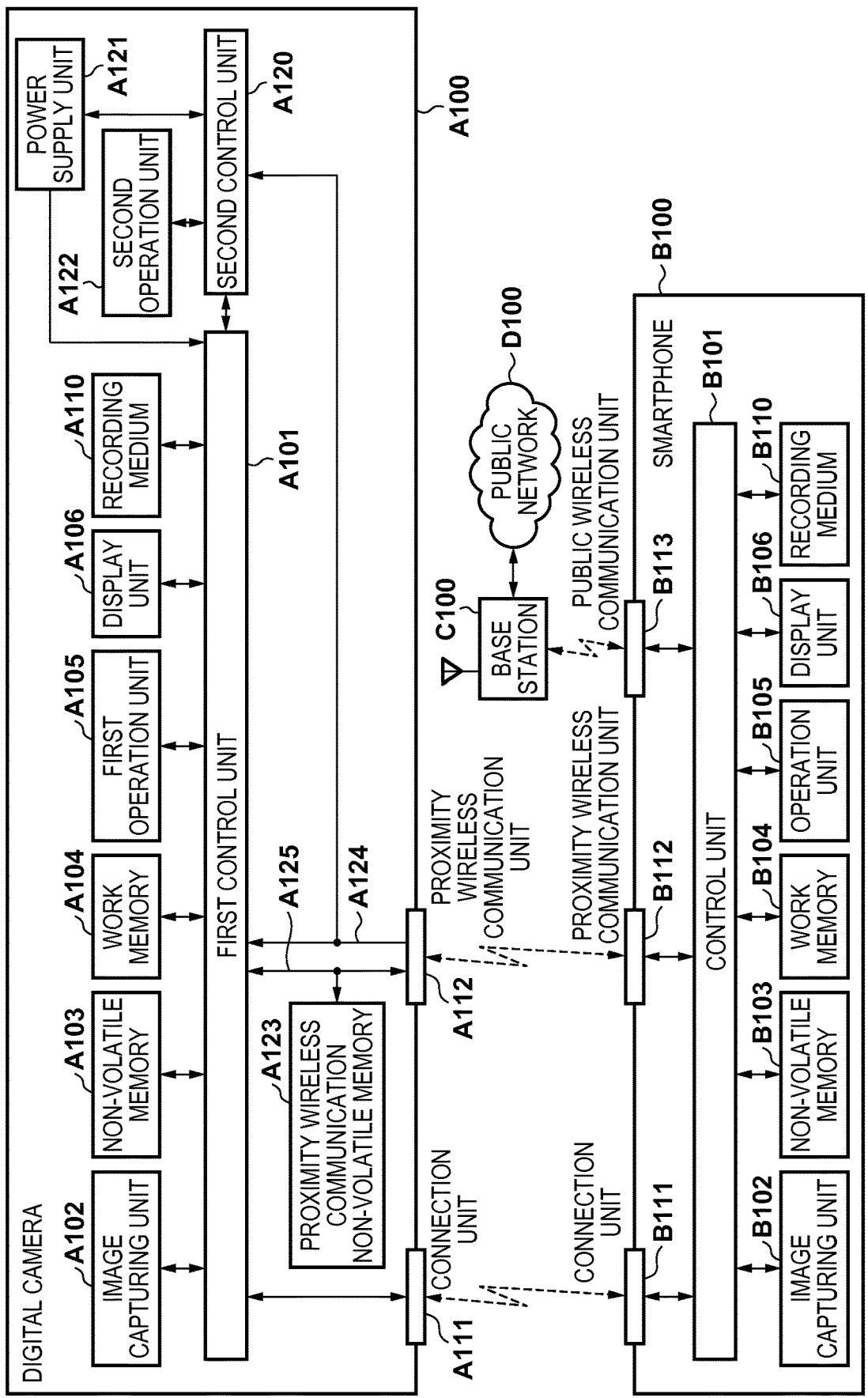
FIG. 1 is a block diagram showing an overall configuration of a communication system according to a first embodiment and a second embodiment.

FIG. 1 is a block diagram showing an overall configuration of a communication system according to the first embodiment. The following describes, as examples of communication apparatus, a digital camera and a smartphone each serving as an image capturing apparatus as well. Note, however, that the communication apparatus is not limited to them, and may be a portable media player, a tablet device, or an information processing apparatus such as a personal computer.

First, a description is given to a digital camera A100. A first control unit A101 controls each unit of the digital camera A100 according to an input signal and a program described below. Note that the entire apparatus may be controlled by a plurality of pieces of hardware that share the processing, instead of by the first control unit A101.

An image capturing unit A102 includes, for example, an optical lens unit, an optical system that controls the aperture, zooming, focusing, etc., and an image sensor for converting the light (image) guided thereto via the optical lens unit into an electrical image signal. As an example of the image sensor, a complementary metal oxide semiconductor (CMOS) or charge coupled device (CCD) image sensor is commonly used. Under the control of the first control unit A101, the image capturing unit A102 converts an optical image of the subject formed by a lens included in the image capturing unit A102 into an electrical signal by using the image sensor, then performs noise reduction processing, etc., and outputs digital data as image data. The digital camera A100 according to the present embodiment records the image data on a recording medium A110 in conformity with the design rule for camera file system (DCF) standard.

A non-volatile memory A103 is an electrically erasable/recordable non-volatile memory, and stores therein, for example, a program described below, which is executed by the first control unit A101. A work memory A104 is used as, for example, a buffer memory for temporarily storing image data captured by the image capturing unit A102, an image display memory for a display unit A106, a work area for the first control unit A101, etc.

A first operation unit A105 receives an operation input from a touch panel formed on the display unit A106 described below. For example, on the display unit A106, the user can touches a subject displayed by the display unit A106. In this case, the first operation unit A105 receives an instruction to perform preparations for still image capturing corresponding to a touched position, such as autofocus (AF) processing, auto exposure (AE) processing, auto white balance (AWB) processing, and pre-flash emission (EF) processing. The first operation unit A105 is also used for inputting characters and the likes by a touch operation via a virtual keyboard displayed by the display unit A106.

The display unit A106 performs, for example, displaying of a live view during the preparations of still image capturing, displaying of captured still image data, and displaying of characters used for an interactive operation. Note that the display unit A106 is not necessarily included in the digital camera A100. The digital camera A100 can be connected not only with the display unit A106 provided for example on the rear surface of the camera, but also with a display unit A106 that is external to the camera, and is required to have at least a display control function to control displaying performed by the display unit A106.

The recording medium A110 can record image data output by the image capturing unit A102. The recording medium A110 may be configured to be attachable to and detachable from the digital camera A100, or embedded in the digital camera A100. In other words, the digital camera A100 is required to have at least the function of accessing the recording medium A110.

A connection unit A111 is an interface used for connecting with an external apparatus. The digital camera A100 according to the present embodiment can exchange data with an external apparatus via the connection unit A111. Note that examples of the connection unit A111 according to the present embodiment include an interface for communication with an external apparatus via a so-called wireless LAN in conformity with the IEEE 802.11 standard. The first control unit A101 achieves wireless communication with an external apparatus by controlling the connection unit A111.

When communicating with the smartphone B100 described below via the connection unit A111, the digital camera A100 can operate in a remote shooting mode or a remote playback mode. In the remote shooting mode, the digital camera A100 performs shooting operations according to a shooting instruction received from the smartphone B100 via the connection unit A111. In the remote playback mode, the digital camera A100 transfers image data stored in the recording medium A110 to the smartphone B100 according to a playback instruction received from the smartphone B100 via the connection unit A111. Thus, the smartphone B100 can display on a display unit B106 an image held by the digital camera A100.

A proximity wireless communication unit A112 is located at a side part of the digital camera A100, for example, and includes an antenna for wireless communication, modulation/demodulation circuitry for processing a wireless signal, a communication controller, etc. The proximity wireless communication unit A112 outputs a modulated wireless signal from the antenna, and demodulates wireless signal received from the antenna. Assume that the proximity wireless communication unit A112 according to the present embodiment performs non-contact proximity wireless communication in conformity with the ISO/IEC 18092 standard (near field communication (NFC)). However, non-contact proximity wireless communication achieved by the proximity wireless communication unit A112 is not limited to NFC, and another wireless communication standard may be adopted. For example, as the non-contact proximity wireless communication achieved by the proximity wireless communication unit A112, non-contact proximity wireless communication in conformity with the ISO/IEC 14443 standard may be adopted.

A proximity wireless communication non-volatile memory A123 is a non-volatile memory included in the proximity wireless communication unit A112. Data stored inside the proximity wireless communication non-volatile memory A123 is transmitted to and received from a smartphone B100 described below via non-contact proximity wireless communication. When a proximity wireless communication unit B112 described below of the smartphone B100 is brought into the proximity of the proximity wireless communication unit A112, communication starts between the digital camera A100 and the smartphone B100. Note that it is not necessary that the proximity wireless communication unit A112 and the proximity wireless communication unit B112 are brought into physical contact. The proximity wireless communication unit A112 and the proximity wireless communication unit B112 can communicate with each other even with some distance therebetween. Therefore, in order to establish wireless connection between the proximity wireless communication unit A112 and the proximity wireless communication unit B112, it is only necessary to bring these communication units close to each other so as to be within a distance that allows them to perform proximity wireless communication. In the following description, bringing the communication units within the distance that allows them to perform proximity wireless communication may also be referred to as "bringing into proximity". When the proximity wireless communication unit A112 and the proximity wireless communication unit B112 are separated by a distance that does not allow them to perform proximity wireless communication, the communication does not start. In addition, in the situation where the proximity wireless communication unit A112 and the proximity wireless communication unit B112 are located within the distance that allows them to perform proximity wireless communication and the communication is being performed, if these communication units are separated by a distance that does not allow them to perform proximity wireless communication, the communication will be disconnected.

An interruption signal line A124 extended from the proximity wireless communication unit A112 is connected to the first control unit A101 and a second control unit A120. In addition, the first control unit A101 and the proximity wireless communication unit A112 are connected via a control signal line A125 for controlling the proximity wireless communication unit A112. By control via the control signal line A125, the first control unit A101 can set the proximity wireless communication unit A112, regarding the timing at which the proximity wireless communication unit A112 outputs the interruption signal via the interruption signal line A124. In addition, by using the control signal line A125, the first control unit A101 can perform reading/writing of data from/to the proximity wireless communication non-volatile memory A123 included in the proximity wireless communication unit A112.

The second control unit A120 is used for controlling a power supply unit A121 according to an operation instruction from the second operation unit A122, and thereby controlling the entire power supply system of the digital camera A100. In particular, the second control unit A120 controls power supply to the first control unit A101. Furthermore, in order to detect communication between the above-described proximity wireless communication unit A112 and proximity wireless communication unit B112, the second control unit A120 receives an interruption signal from the proximity wireless communication unit A112 via the interruption signal line A124.

The second operation unit A122 is used for receiving an instruction to the digital camera A100 from the user. The second operation unit A122 includes, for example, a power button used by the user for making an instruction to power ON or OFF the digital camera A100, a release switch for making an instruction to perform image capturing, and a playback button for making an instruction to playback image data. In addition, the second operation unit A122 includes an operation member such as a connection button dedicated to start communication with an external device via the connection unit A111. Note that the release switch, which is not shown in the drawing, includes SW1 and SW2. SW1 is turned on when the release switch is brought into a so-called half-pressed state. As a result, the second operation unit A122 receives an instruction to perform preparations for still image capturing, such as autofocus (AF) processing, auto exposure (AE) processing, auto white balance (AWB) processing, and pre-flash emission (EF) processing. SW2 is turned on when the release switch is brought into a so-called fully-pressed state. As a result, the second operation unit A122 receives an instruction to perform still image capturing. The above-described first operation unit A105 is an operation unit for a touch panel operation, whereas the second operation unit A122 is an operation unit for a button operation using a mechanical mechanism.

The power supply unit A121 is connected to a battery of the digital camera A100, which is not shown in the drawing. When a battery is inserted, the power supply unit A121 first supplies power only to the second control unit A120. Under this condition, the second control unit A120 controls the power supply unit A121 according to an operation from the second operation unit A122, thereby allowing power to be supplied to the first control unit A101 and the peripheral circuitry controlled by the first control unit A101.

Next, a description is given to the smartphone B100. A control unit B101 controls each unit of the smartphone B100 according to an input signal and a program described below. Note that the entire apparatus may be controlled by, instead of the control unit B101, a plurality of pieces of hardware that share the processing.

An image capturing unit B102 includes, for example, an optical lens unit, an optical system that controls the aperture, zooming, focusing, etc., and an image sensor for converting the light (image) guided thereto via the optical lens unit into an electrical image signal. As an example of the image sensor, a CMOS or a CCD is commonly used. Under the control of the control unit B101, the image capturing unit B102 converts an optical image of the subject formed by a lens included in the image capturing unit B102 into an electrical signal by using the image sensor, then performs noise reduction processing, etc., and outputs digital data as image data. The smartphone B100 according to the present embodiment records the image data on a recording medium B110 in conformity with the DCF standard.

A non-volatile memory B103 is an electrically erasable/recordable non-volatile memory, and stores therein a program described below, etc., which is executed by the control unit B101. A work memory B104 is used as a buffer memory for temporarily storing image data captured by the image capturing unit B102, an image display memory for a display unit B106, a work area for the control unit B101, etc.

An operation unit B105 is used for receiving an instruction to the smartphone B100 from the user. The operation unit B105 includes, for example, a power button used by the user for making an instruction to power ON or OFF the smartphone B100, and an operation button for making an instruction to switch from one screen to another. A touch panel formed on the display unit B106 described below is also included in the operation unit B105.

The display unit B106 performs displaying of captured still image data, displaying of graphical user interface (GUI) used for an interactive operation, etc. Note that the display unit B106 is not necessarily included in the smartphone B100. The smartphone B100 is required to have at least a display control function to control the contents to be displayed.

The recording medium B110 can record image data output by the image capturing unit B102. The recording medium B110 may be configured to be attachable to and detachable from the smartphone B100, or embedded in the smartphone B100. In other words, the smartphone B100 is required to have at least the function of accessing the recording medium B110.

A connection unit B111 is an interface used for connecting with an external apparatus. The smartphone B100 according to the present embodiment can exchange data with an external apparatus via the connection unit B111. Note that examples of the connection unit B111 according to the present embodiment include an interface for communication with an external apparatus via a so-called wireless LAN in conformity with the IEEE 802.11 standard. The control unit B101 achieves wireless communication with an external apparatus by controlling the connection unit B111.

As described above, when communicating with the smartphone B100 via the connection unit A111, the digital camera A100 can operate in the remote shooting mode or the remote playback mode. The smartphone B100 can provide the digital camera A100 with an instruction specifying the operation mode of the digital camera A100. When the digital camera A100 operates in the remote playback mode, the smartphone B100 can select an image displayed on the display unit B106, and can download the selected image to the recording medium B110 inside the smartphone B100.

A proximity wireless communication unit B112 is located at a side part of the smartphone B100, for example, and includes an antenna for wireless communication, modulation/demodulation circuitry for processing a wireless signal, a communication controller, etc. The proximity wireless communication unit B112 outputs a modulated wireless signal from the antenna, and demodulates wireless signal received from the antenna. Assume that the proximity wireless communication unit B112 according to the present embodiment performs non-contact proximity wireless communication in conformity with the ISO/IEC 18092 standard (near field communication (NFC)). However, non-contact proximity wireless communication achieved by the proximity wireless communication unit B112 is not limited to NFC, and another wireless communication standard may be adopted. For example, as the non-contact proximity wireless communication achieved by the proximity wireless communication unit B112, non-contact proximity wireless communication in conformity with the ISO/IEC 14443 standard may be adopted.

When the proximity wireless communication unit B112 is brought into the proximity of the above-described proximity wireless communication unit A112 of the digital camera A100, communication starts between the digital camera A100 and the smartphone B100. Note that it is not necessary that the proximity wireless communication unit B112 and the proximity wireless communication unit A112 are brought into physical contact. The proximity wireless communication unit B112 and the proximity wireless communication unit A112 can communicate with each other even with a distance therebetween. Therefore, in order to establish wireless connection between the proximity wireless communication unit B112 and the proximity wireless communication unit A112, it is only necessary to bring these communication units close to each other so as to be within a distance that allows them to perform proximity wireless communication. When the proximity wireless communication unit B112 and the proximity wireless communication unit A112 are separated by a distance that does not allow them to perform proximity wireless communication, the communication does not start. In addition, in the situation where the proximity wireless communication unit B112 and the proximity wireless communication unit A112 are located within the distance that allows them to perform proximity wireless communication and communication is being performed, if these communication units are separated by a distance that does not allow them to perform proximity wireless communication, the communication will be disconnected.

A public wireless communication unit B113 is an interface for achieving communication using a public network D100 via a base station C100. The public wireless communication unit B113 includes an antenna for wireless communication, modulation/demodulation circuitry for processing a wireless signal, a communication controller, etc. The public wireless communication unit B113 achieves public wireless communication in conformity with the W-CDMA (UMTS) standard, the long term evolution (LTE) standard, etc.

Although FIG. 1 as an exemplary illustration shows that the digital camera A100 and the smartphone B100 can perform one-to-one communication, one-to-many communication is also available. The one-to-many communication will be described in the second embodiment.

Next, with reference to FIG. 2A, a description is given to an outline of the operation of a communication system according to the present embodiment. FIG. 2A is a sequence diagram showing a processing flow from when the digital camera A100 performs proximity wireless communication with the smartphone B100 to when the digital camera A100 establishes wireless LAN communication. In the following, the same reference signs as in FIG. 1 are used for describing the components of each apparatus. In addition, the dotted arrows used in FIG. 2A express communication via NFC, and the bold arrows used in FIG. 2A express communication via a wireless LAN.

At the time when the sequence shown in FIG. 2A starts, the activation processing for the first control unit A101 of the digital camera A100 has been completed. However, the connection unit A111 is powered off, and wireless LAN connection with the smartphone B100 via the connection unit A111 has not been established. The aforementioned activation processing includes, for example, initialization of the shooting functions of the digital camera A100, such as initialization of the operating system (OS) and initialization of peripheral devices.

The smartphone B100 is configured to be able to switch between the enabled state and the disabled state for each of the NFC function and the wireless LAN function according to a user operation. Before the start of the sequence shown in FIG. 2A, the NFC function is in the "enabled" state and the wireless LAN function is in the "disabled" state. In addition, the smartphone B100 is executing a predetermined application on the control unit B101, the application being for establishing wireless LAN connection with the digital camera A100.

Assume that the sequence in FIG. 2A described below is started when the digital camera A100 and the smartphone B100 are under the above-described conditions. Specifically, when the smartphone B100 that is executing the predetermined application is brought by the user into the proximity of the digital camera A100, the proximity wireless communication unit A112 and the proximity wireless communication unit B112 become able to communicate with each other, and the sequence shown in FIG. 2A starts.

First at step S211, the control unit B101 of the smartphone B100 provides the proximity wireless communication unit B112 with a read request (parameter request) for reading information existing in the proximity wireless communication non-volatile memory A123 of the digital camera A100.

At step S212, via NFC communication, the proximity wireless communication unit B112 provides the proximity wireless communication unit A112 of the digital camera A100 with a read request (Read command). At step S213, in response to the read request made at step S212, the proximity wireless communication unit A112 of the digital camera A100 transmits the information within the proximity wireless communication non-volatile memory A123 to the proximity wireless communication unit B112 of the smartphone B100.

At step S214, the proximity wireless communication unit B112 of the smartphone B100 provides the control unit B101 with the information received at step S213. At step S215, the control unit B101 temporarily stores the information provided at step S214 into the work memory B104.

Through the processing performed so far, the smartphone B100 has acquired the information from the digital camera A100 by using the proximity wireless communication unit B112. In the present embodiment, the information acquired in such a manner is a wireless parameter. Therefore, the read request made at step S212 serves as a request for acquiring the wireless parameter. The wireless parameter is information (setting information) such as an SSID required for establishing wireless LAN connection and encryption key used in wireless LAN connection. In order to limit devices that connect via wireless LAN connection, the wireless parameter may also include information that can identify an individual device, such as the MAC address of the digital camera A100. Also, in order to shorten the connection time required for establishing the wireless LAN connection with the digital camera A100 described below, the wireless parameter may also include information of the wireless LAN channel to be used.

Next, at step S216, the control unit B101 provides the proximity wireless communication unit B112 with a parameter acquisition completion notification. The parameter acquisition completion notification indicates that the acquisition of the wireless parameter has been normally completed. The parameter acquisition completion notification is provided by, for example, providing the proximity wireless communication non-volatile memory A123 with a request (Write command) for writing information indicating that the acquisition of the wireless parameter has been normally completed.

At step S217, the proximity wireless communication unit B112 provides the proximity wireless communication unit A112 of the digital camera A100 with the parameter acquisition completion notification via NFC communication. At step S218, in response to the parameter acquisition completion notification, the proximity wireless communication unit A112 provides the interruption signal to the first control unit A101 via the interruption signal line A124.

In parallel with the provision of the interruption signal (interruption notification) at step S218, the proximity wireless communication unit A112, at step S219, returns a response (parameter acquisition completion response) to the parameter acquisition completion notification, to the proximity wireless communication unit B112 of the smartphone B100. At step S220, the proximity wireless communication unit B112 of the smartphone B100 provides the control unit B101 with the parameter acquisition completion response.

Through the processing performed so far, the smartphone B100 has acquired the wireless parameter from the proximity wireless communication non-volatile memory A123 included in the digital camera A100 by using the proximity wireless communication unit B112. Also, the smartphone B100 has notified the digital camera A100 of the normal completion of the wireless parameter.

Next, at step S221, the control unit B101 of the smartphone B100 enables the connection unit B111 by using the wireless parameter acquired at step S215. In other words, the control unit B101 performs processing for starting wireless LAN communication. At step S222, the connection unit B111 searches for the other party of the wireless LAN communication. Specifically, the connection unit B111 continues the search until the connection unit A111 of the digital camera A100 is activated and the SSID acquired at step S215 is detected by the wireless LAN communication.

Meanwhile, in response to the interruption notification provided at step S218, the first control unit A101 of the digital camera A100, at step S226, provides the proximity wireless communication unit A112 with a read request for reading the wireless parameter stored in the proximity wireless communication non-volatile memory A123. At step S227, the proximity wireless communication unit A112 reads information having a predetermined size from a predetermined address in the proximity wireless communication non-volatile memory A123, and returns the information to the first control unit A101. The communication between the first control unit A101 and the proximity wireless communication unit A112 at steps S226 and S227 is performed by using the control signal line A125.

At step S228, the first control unit A101 temporarily stores the information (wireless parameter) acquired at step S227 into the work memory A104. At step S229, the first control unit A101 activates the connection unit A111 by using the temporarily stored wireless parameter, that is, the same wireless parameter as the wireless parameter acquired by the smartphone B100. Thus, the connection unit A111 starts transmitting a beacon containing the same wireless parameter as the wireless parameter acquired by the smartphone B100.

After the connection unit A111 is activated, the smartphone B100 that is searching for a wireless LAN device (See step S222) can detect the digital camera A100 via wireless LAN communication. In other words, the smartphone B100 detects the digital camera A100 by receiving the beacon transmitted by the connection unit A111 of the digital camera A100. As a result, at step S230, the digital camera A100 and the smartphone B100 establish wireless LAN connection. At step S231, the digital camera A100 and the smartphone B100 confirm that the wireless LAN connection has been established, and perform wireless LAN communication. For example, image data is exchanged therebetween.

After the establishment of the wireless LAN connection, at step S240, the first control unit A101 requests the proximity wireless communication unit A112 to rewrite (update) the wireless parameter stored in the proximity wireless communication non-volatile memory A123. At step S241, the first control unit A101 receives, as a response to the request made at step S240, a response indicating that the rewriting of the wireless parameter has been completed.

Steps S240 and S241 are steps for improving the security after the establishment of the wireless LAN connection between the digital camera A100 and the smartphone B100. According to the present embodiment, not only the smartphone B100 (the first communication apparatus) but also another smartphone (the second communication apparatus) that is different from the smartphone B100 can access the proximity wireless communication non-volatile memory A123 via the proximity wireless communication unit A112. As described above, the wireless parameter stored in the proximity wireless communication non-volatile memory A123 of the proximity wireless communication unit A112 includes an SSID required for establishing wireless LAN connection between the digital camera A100 and the smartphone B100, an encryption key, etc. In the case where the wireless parameter is not rewritten, there is the possibility that, when the digital camera A100 and the smartphone B100 are performing wireless LAN communication, another smartphone that is different from the smartphone B100 acquires the same wireless parameter via proximity wireless communication. In this case, another smartphone can intercept the communication. The occurrence of such a problem can be suppressed by rewriting the wireless parameter. For this purpose, the digital camera A100 rewrites the wireless parameter in the proximity wireless communication non-volatile memory A123 with a value from which the wireless parameter in use cannot be inferred. Specifically, the digital camera A100 may rewrite the wireless parameter with a wireless parameter determined by using a random number generation algorithm. However, in the present embodiment, the algorithm is not limited to any particular algorithm.

Through the processing above, the digital camera A100 and the smartphone B100 can share a wireless parameter, whereas another smartphone is prevented from acquiring the same wireless parameter. As a result, the security of the wireless LAN communication between the digital camera A100 and the smartphone B100 can be improved.

Meanwhile, in the example shown in FIG. 2A, the digital camera A100 rewrites the wireless parameter in the proximity wireless communication non-volatile memory A123 after confirming at step S231 that the wireless LAN connection with the smartphone B100 has been established. However, the digital camera A100 may rewrite the wireless parameter with another timing, as long as it is after the acquisition of the wireless parameter at steps S226 and S227. For example, the digital camera A100 may rewrite the wireless parameter at the timing of acquiring the wireless parameter from the proximity wireless communication non-volatile memory A123. If this is the case, the wireless parameter is written regardless of whether or not the wireless LAN connection will be established eventually, and the security of the wireless LAN communication is further improved.

Figure 2B:
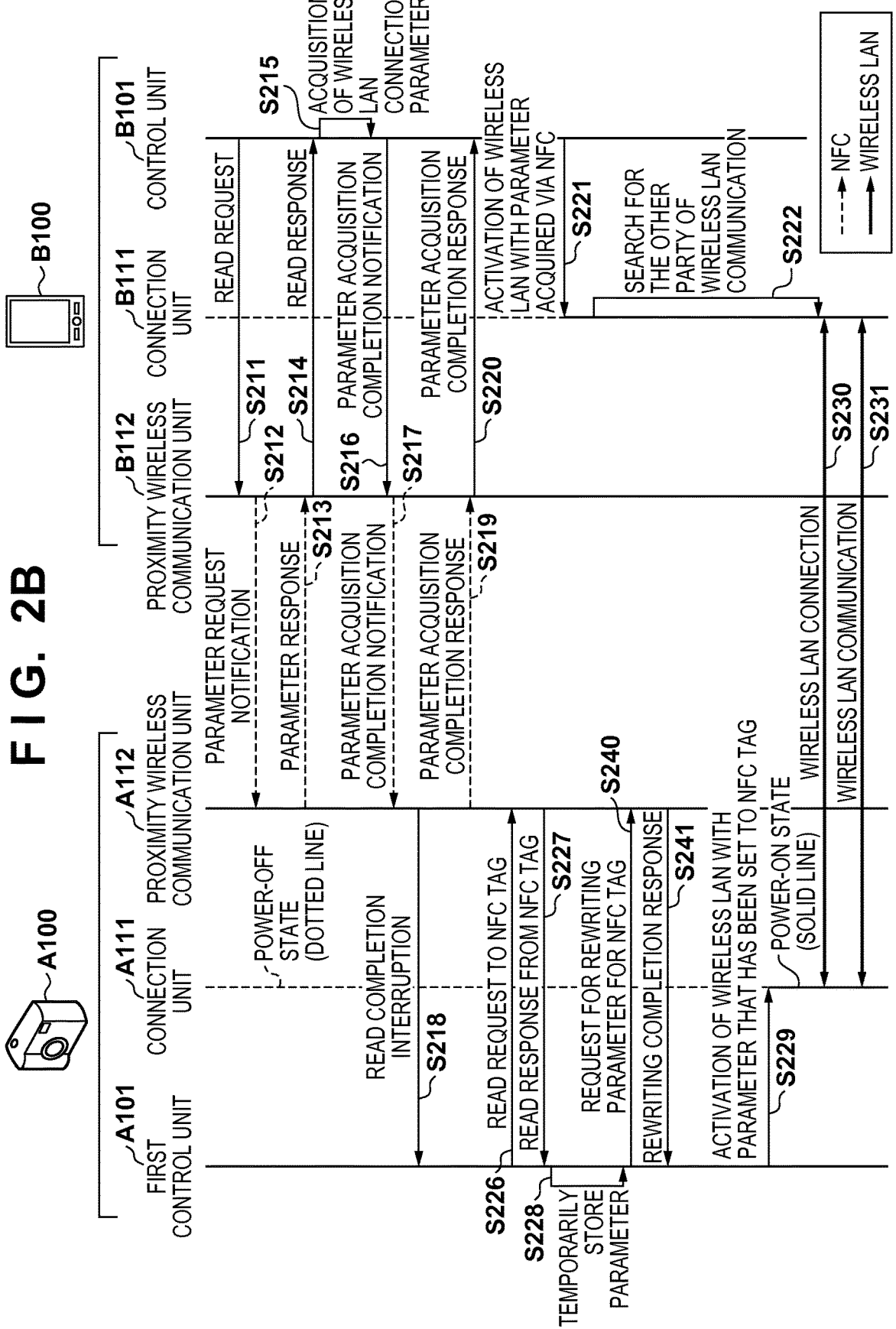
FIG. 2B is a sequence diagram showing a modification example of FIG. 2A.

The operations of the digital camera A100 in this case is described next with reference to FIG. 2B. In FIG. 2B, the same reference signs are provided for the steps for performing the same or similar processing as in FIG. 2A. FIG. 2B is different from FIG. 2A in that steps S240 and S241 are performed after step S228. Note that the first control unit A101 withholds the execution of the processing at step S229 until the processing at steps S240 and S241 will be completed. Since it takes relatively long time to establish wireless LAN connection, and accordingly, in the case of FIG. 2A, another smartphone could possibly acquire the wireless parameter, for example during the connection processing performed at step S230. In contrast, in the case of FIG. 2B, the rewriting of the wireless parameter has already been completed before the connection processing performed at step S230, and another smartphone cannot acquire the same wireless parameter. In addition, even if the establishment of the wireless LAN connection fails at step S230 and the digital camera A100 stops the processing sequence shown in FIG. 2B, another smartphone cannot acquire the wireless parameter, because the rewriting of the wireless parameter has already been completed. Therefore, the security of the wireless LAN communication is further improved in FIG. 2B than in FIG. 2A.

Alternatively, the first control unit A101 may rewrite (update) the wireless parameter at the timing described below in addition to the timing shown in FIG. 2A or FIG. 2B. That is, the first control unit A101 may also rewrite (update) the wireless parameter when the digital camera A100 is powered on (i.e., the activation processing for the first control unit A101 is performed) in response to the user operates the operation unit A105. As a result, the wireless parameter read out by the smartphone B100 is invalidated in a practical sense when the digital camera A100 is powered off, and thus the security is further improved.

As described above, according to the first embodiment, the digital camera A100 updates the wireless parameter stored in the proximity wireless communication non-volatile memory A123 at a predetermined timing after the smartphone B100 acquires the wireless parameter from the proximity wireless communication non-volatile memory A123. This operation suppresses the situation where a plurality of smartphones acquire a same wireless parameter, and improves the security of the wireless LAN communication.

Second Embodiment

The first embodiment is effective to cases where the digital camera A100 and the smartphone B100 establishes one-to-one connection. However, users does not necessarily demand one-to-one connection, and may demand one-to-many connection. In the case of the first embodiment, it is not possible that a plurality of smartphones acquire a same wireless parameter, and accordingly, it is not possible that a plurality of smartphones join in a same wireless LAN network. Thus, one-to-many connection cannot be realized. Considering this fact, the second embodiment describes a configuration for achieving one-to-many connection as needed.

First, a description is given to a situation where one-to-one connection is preferable and a situation where one-to-many connection is preferable, with reference to FIGS. 3A and 3B. In FIGS. 3A and 3B, the network 301 is a network established according to the wireless parameter stored in the proximity wireless communication non-volatile memory A123 of the digital camera A100.

In FIG. 3A, the digital camera A100 is operating in the remote shooting mode described above. In this case, the smartphone B100 can set the shooting parameters (e.g. ISO sensitivity and white balance) for the digital camera A100 via wireless LAN communication. In this case, if a plurality of smartphones can set the shooting parameters for the digital camera A100 at the same time, there is the possibility that a shooting parameter set by one user is changed by another user and intended shooting cannot be performed. For this reason, one-to-one connection is considered to be preferable in the remote shooting mode.

On the other hand, in FIG. 3B, the digital camera A100 is operating in the remote playback mode described above. In this case, the smartphone B100 can acquire image data stored in the recording medium A110 of the digital camera A100 and cause the display unit B106 to play back the image data, and download a selected image to the recording medium B110 of the smartphone B100. In this case, it is effective if a plurality of smartphones can access the smartphone B100 and download an image. For this reason, one-to-many connection is considered to be preferable in the remote playback mode. In the example case shown in FIG. 3B, three smartphones, namely smartphones B100-1, B100-2, and B100-3, are joining in the network 301.

As described above, there are situations where one-to-one connection is preferable and situations where one-to-many connection is preferable, depending on the operation mode of the digital camera A100 during the wireless LAN communication. From this point of view, the digital camera A100 according to the second embodiment determines whether or not to update (rewrite) the wireless parameter according to the operation mode during the wireless LAN communication.

Although the description with reference to FIGS. 3A and 3B are based on the assumption that one-to-one connection is preferable in the remote shooting mode and one-to-many connection is preferable in the remote playback mode, this is merely an example, and the relationship between the operation modes and preferable connection configurations is not limited to the examples shown in FIGS. 3A and 3B. In addition, operation modes selectable by the digital camera A100 are not limited to the remote shooting mode and the remote playback mode, and the digital camera A100 may operate in other modes. The operation modes also varies according to the type of the communication apparatus to which the present embodiment is applied. For example, a communication apparatus without the image capturing function is considered not to have the remote shooting mode. Therefore, for such a communication apparatus, an operation mode other than the remote shooting mode is the operation mode in which one-to-one connection is preferable.

Figure 4:
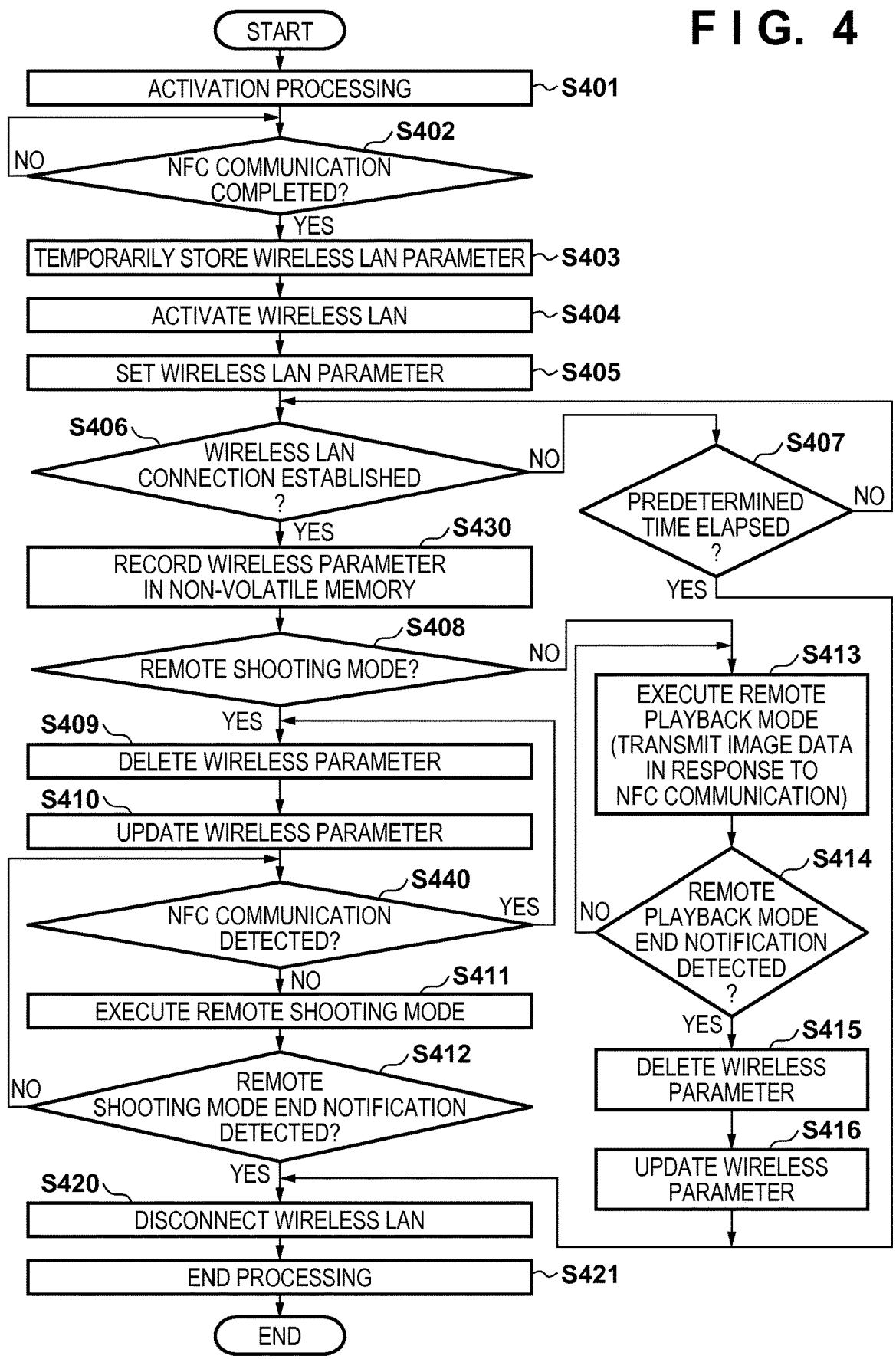
FIG. 4 is a flowchart according to the second embodiment, showing operations of the digital camera A100.

Next, with reference to FIG. 4, a description is given to the operations of the digital camera A100. The processing according to this flowchart starts when the user powers on the digital camera A100 by operating the second operation unit A122. Note that the processing shown in this flowchart is realized by the first control unit A101 of the digital camera A100, controlling each unit of the digital camera A100 according to an input signal and a program.

First, at step S401, the first control unit A101 performs activation processing. Specifically, the first control unit A101 performs initialization of the operating system (OS), initialization of peripheral devices connected to the first control unit A101, etc. Also, as part of the activation processing, the first control unit A101 may update the wireless parameter stored in the proximity wireless communication non-volatile memory A123 of the proximity wireless communication unit A112. The proximity wireless communication unit A112 according to the present embodiment is configured to be able to operate by generating an electromotive force from the magnetic field generated by the proximity wireless communication unit B112 of the smartphone B100, even when no power is supplied from the body of the digital camera A100. Therefore, there is the possibility that the wireless parameter stored in the proximity wireless communication non-volatile memory A123 has been read out by another smartphone while the digital camera A100 is being powered off. Since the wireless parameter read out during the power-off period is invalidated by updating the wireless parameter at step S401, the security is further improved.

Upon completion of the activation processing, the first control unit A101, at step S402, waits until it detects the completion of NFC communication with the smartphone B100. Specifically, the first control unit A101 detects an interruption signal output from the proximity wireless communication unit A112 via the interruption signal line A124. Thus, the first control unit A101 can detect that the smartphone B100 has completed the NFC communication and has acquired the wireless parameter from the proximity wireless communication non-volatile memory A123.

At step S403, the first control unit A101 acquires the wireless parameter from the proximity wireless communication non-volatile memory A123, and temporarily stores the wireless parameter in the work memory A104. At step S404, the first control unit A101 activates the connection unit A111. Specifically, the first control unit A101 activates the connection unit A111 by controlling, via the second control unit A120, the power supply unit A121 which controls power supply to the connection unit A111.

At step S405, the first control unit A101 sets, to the connection unit A111, the wireless parameter temporarily stored in the work memory A104. The wireless parameter mentioned here is the same as the wireless parameter acquired by the smartphone B100 at step S402 via NFC communication. Once the wireless parameter is set, the digital camera A100 can transmit Beacon information including SSID information, which has been set at step S405, by using the connection unit A111.

At step S406, the first control unit A101 determines whether wireless LAN connection with the smartphone B100 has been established or not. Since the smartphone B100 has acquired via NFC communication the same wireless parameter as the digital camera A100, it is likely that the wireless LAN connection will be normally established. However, there is the possibility that the wireless LAN connection is not established because of low remaining battery level of the smartphone B100 even though the NFC communication was successful. When the wireless LAN connection is not established, the first control unit A101 determines at step S407 whether a predetermined period has elapsed or not. When the first control unit A101 determines that the predetermined period has not elapsed, the processing returns to step S408. In the case where the wireless LAN connection is not established when the predetermined period has elapsed, the first control unit A101 determines that the smartphone B100 temporarily cannot activate a wireless LAN, and terminates the wireless LAN operation at step S420.

When the wireless LAN connection is established at step S406, the first control unit A101, at step S430, writes the wireless parameter temporarily stored in the work memory A104 at step S403 into the non-volatile memory A103. By performing the processing at step S430, the digital camera A100 becomes able to hold the wireless parameter used for the wireless LAN connection with the smartphone B100, even after being powered off. Thus, re-establishment of the wireless LAN connection with the smartphone B100 will be easy. Specifically, once the wireless parameter in the proximity wireless communication non-volatile memory A123 is updated at step S410 described below, the first control unit A101 cannot acquire the same wireless parameter from the proximity wireless communication non-volatile memory A123 again. Therefore, when the processing at step S430 is not performed, in order to re-establish the wireless LAN connection after the digital camera A100 is powered off, it is necessary to bring the digital camera A100 and the smartphone B100 close to each other. When the processing at step S430 is performed, the digital camera A100 can acquire the wireless parameter from the non-volatile memory A103 when the digital camera A100 is powered on again, and the smartphone B100 is already holding this wireless parameter. Therefore, there is no need to bring the digital camera A100 and the smartphone B100 close to each other in order to re-establish the wireless LAN connection. In addition, the wireless parameter stored in the non-volatile memory A103 cannot be read out by an external apparatus via proximity wireless communication, unlike the wireless parameter stored in the proximity wireless communication non-volatile memory A123.

The digital camera A100 may have a mechanism for associating the wireless LAN parameter stored in the non-volatile memory A103 with the smartphone B100 as the communication party. Specifically, using the first operation unit A105, the user inputs a name or the like identifying the smartphone B100, and the first control unit A101 associates the input name with the wireless LAN parameter. Thus, the user can store the wireless LAN parameter in the non-volatile memory A103 in the form that the user can easily identify. Also, the first control unit A101 can display on the display unit A106 the wireless parameter for the smartphone to which the first control unit A101 connected once via a wireless LAN such that the user can easily select the wireless parameter.

Due to the processing above, when powering on the digital camera A100 next time and establishing the connection with the smartphone that the digital camera A100 once connected in the past, the user can easily re-establish the connection by selecting the corresponding wireless parameter on the display unit A106. In other words, the digital camera A100 does not need to perform proximity wireless communication in order to re-establish the wireless LAN connection with a smartphone if the digital camera A100 once connected to the smartphone.

Next, at step S408, the first control unit A101 starts wireless LAN communication with the smartphone B100, and determines whether or not the operation mode is the remote shooting mode. A notification of the operation mode is provided by the smartphone B100 at the start of the wireless LAN communication. When the first control unit A101 determines that the operation mode is the remote shooting mode, the processing moves to step S409, and when the first control unit A101 determines that the operation mode is not the remote shooting mode (the operation mode is the remote playback mode), the processing moves to step S413.

At step S409, the first control unit A101 deletes the wireless parameter in the proximity wireless communication non-volatile memory A123. Consequently, it will be unable for other smartphones to acquire the wireless parameter that is currently being used for the wireless LAN communication between the digital camera A100 and the smartphone B100. At step S410, the first control unit A101 updates the wireless parameter in the proximity wireless communication non-volatile memory A123 to be a value from which the wireless parameter in use cannot be inferred. The algorithm for determining a new wireless parameter is not limited to any particular algorithm, as in the first embodiment.

Through the processing above, when the digital camera A100 operates in the remote shooting mode, the wireless parameter is shared only between the digital camera A100 and the smartphone B100.

The processing at step S440 is performed next to step S410. However the details of the processing at step S440 will be described after the description of step S421. First, a description is given to step S411.

At step S411, the first control unit A101 hands over the right to perform the shooting operation to the smartphone B100, and comes into the state for waiting for a remote shooting instruction from the smartphone B100. Specifically, the first control unit A101 controls the image capturing unit A102 to convert the image of the object formed by the lens into an electrical signal by using the image sensor, and performs noise reduction processing and so on. Then, the first control unit A101 transfers, as image data, the digital data that has undergone the noise reduction processing, to the smartphone B100 via a wireless LAN. The smartphone B100 displays on the display unit B106 the image data thus transferred via a wireless LAN. As a result, a user in a remote location will be able to check the live-view image of the digital camera A100. Also, shooting parameters (e.g., ISO sensitivity and white balance) for the digital camera A100 and Av or Tv shooting performed thereby can be set from the smartphone B100. In such a situation, when the smartphone B100 provides the digital camera A100 with a shooting instruction, the first control unit A101 of the digital camera A100 performs a shutter operation, and records the acquired image data onto the recording medium A110. In this stage, the first control unit A101 may generate image data by resizing the data recorded on the recording medium A110, and transfer the image data to the smartphone B100.

At step S412, the first control unit A101 determines whether or not a remote shooting mode end notification from the smartphone B100 has been detected. The remote shooting mode end notification mentioned above occurs for example when the smartphone B100 terminates an application for controlling the digital camera A100. The first control unit A101 also detects, as the remote shooting mode end notification, a notification of ending of the wireless LAN communication, transmitted from the smartphone B100. When the first control unit A101 does not detect the remote shooting mode end notification, the processing returns to step S440, and the first control unit A101 continues the operation in the remote shooting mode. When the first control unit A101 detects the remote shooting mode end notification, the processing moves to step S420.

At step S420, the first control unit A101 stops power supply to the connection unit A111 by controlling, via the second control unit A120, the power supply unit A121 that controls power supply to the connection unit A111. Consequently, the wireless LAN communication will be disconnected. At step S421, the first control unit A101 performs end processing.

Here, a description is given to the processing at step S440. The processing at step S440 is performed in order to address the case where a smartphone other than the smartphone B100 comes into the proximity of the digital camera A100 operating in the remote shooting mode. The proximity wireless communication unit A112 according to the present embodiment is configured to, even while the digital camera A100 is performing wireless LAN communication with the smartphone B100, transmit the wireless parameter stored in the proximity wireless communication non-volatile memory A123 to another smartphone that has come into the vicinity. Therefore, when another smartphone comes into the vicinity when the digital camera A100 is operating in the remote shooting mode, there is the possibility that the other smartphone acquire, via NFC communication, the wireless parameter updated at step S410. If the wireless parameter acquired by the other smartphone is still held in the proximity wireless communication non-volatile memory A123, there is the possibility that yet another smartphone acquires the same wireless parameter. If this wireless parameter is used for wireless LAN communication in the feature, one-to-one connection will not be ensured. To address this problem, the first control unit A101 determines at step S440 whether or not NCF communication has been detected, based on the interruption notification from the proximity wireless communication unit A112. When the first control unit A101 detects NFC communication, the processing returns to step S409, and the first control unit A101 performs deletion and updating of the wireless parameter in the proximity wireless communication non-volatile memory A123. Consequently, there will be no possibility that the wireless parameter acquired by another smartphone will be used for wireless LAN communication in the future, and this wireless parameter is invalidated in a practical sense.

Next, a description is given to the case where the digital camera A100 is operating in the remote playback mode. When the first control unit A101 determines at step S408 that the operation mode is the remote playback mode, the first control unit A101, at step S413, transfers the thumbnail images stored in the recording medium A110 to the smartphone B100 via a wireless LAN. The smartphone B100 displays the acquired thumbnail images on the display unit B106 so that the user can select an image that the user wishes to download to the smartphone B100 The first control unit A101, via the wireless LAN, identifies the image selected on the smartphone B100, expands, on the work memory A104, the corresponding image data acquired from the recording medium A110, and transfers the image data to the smartphone B100. The first control unit A101 may transmit the image data to the smartphone B100 via the wireless LAN communication response to performing NFC communication with the smartphone B100 during the operation in the remote playback mode. The image data to be transmitted in this case is, for example, the image data corresponding to an image displayed on the display unit A106. The first control unit A101 can detect the NFC communication with the smartphone B100 by receiving an interruption notification via the interruption signal line A124 for example.

At step S414, the first control unit A101 determines whether or not a remote playback mode end notification from the smartphone B100 has been detected. The remote playback mode end notification mentioned above occurs for example when the smartphone B100 terminates an application for controlling the digital camera A100. The first control unit A101 also detects, as the remote playback mode end notification, a notification of ending of the wireless LAN communication, transmitted from the smartphone B100. When the first control unit A101 does not detect the remote playback mode end notification, the processing returns to step S413, and the first control unit A101 continues the operation in the remote playback mode. When the first control unit A101 detects the remote playback mode end notification, the processing moves to step S415.

At steps S415 and S416, the first control unit A101 performs deletion and updating of the wireless parameter, as at steps S409 and S410.

As described above, when operating in the remote playback mode, the digital camera A100 does not update the wireless parameter in the proximity wireless communication non-volatile memory A123. Therefore, via proximity wireless communication, a smartphone other than the smartphone B100 can acquire the wireless parameter that is currently being used by the digital camera A100. In other words, another smartphone can join in the network established by the digital camera A100 and the smartphone B100 (See FIG. 3B).

Figure 5:
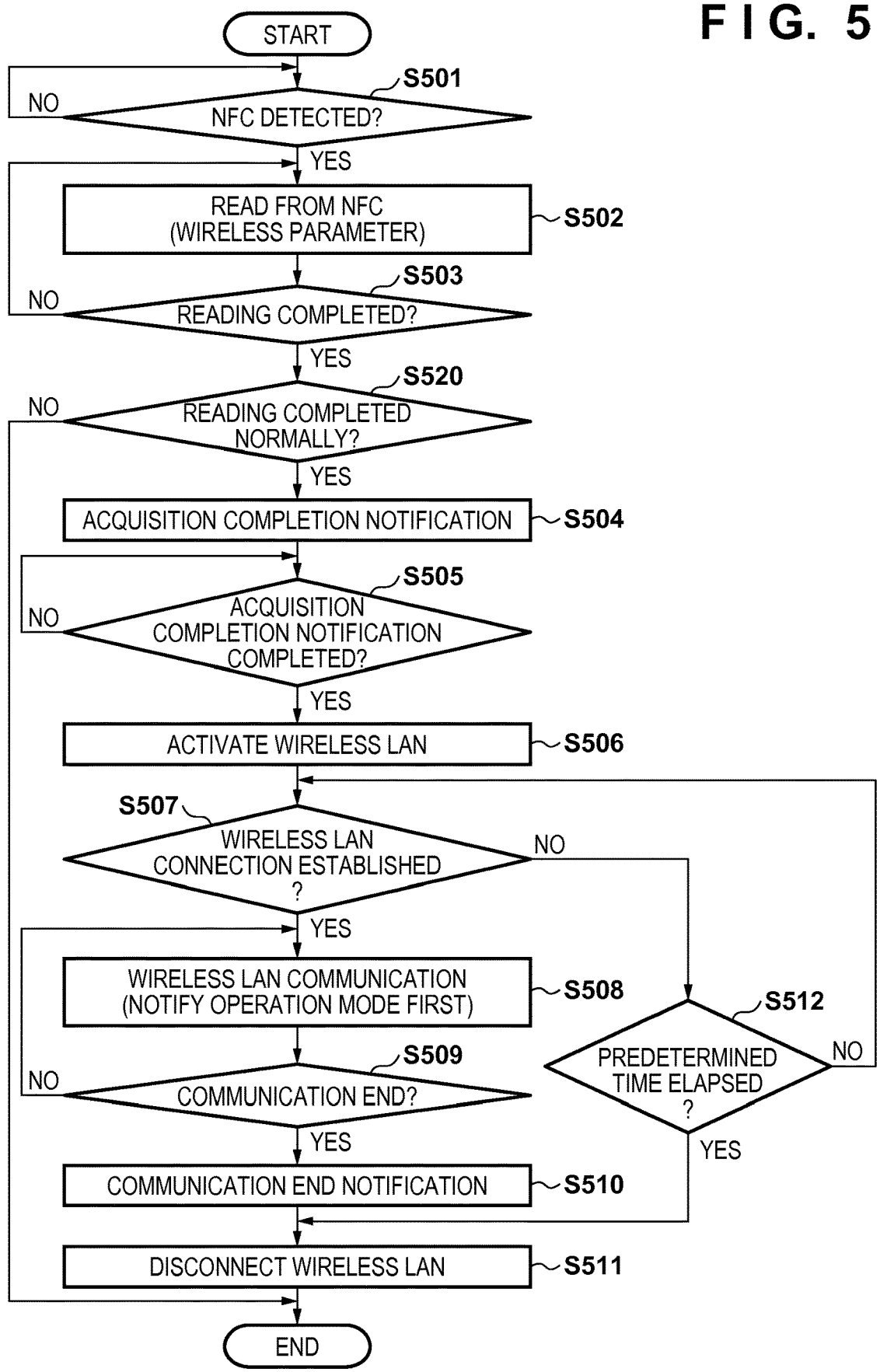
FIG. 5 is a flowchart according to the second embodiment, showing operations of the smartphone B100.

Next, with reference to FIG. 5, a description is given to the operations of the smartphone B100. The processing shown by this flowchart is realized by the control unit B101 of the smartphone B100, controlling each unit of the smartphone B100 according to an input signal and a program.

At the beginning, the smartphone B100 is executing a predetermined application on the control unit B101, the application being for establishing wireless LAN connection with the digital camera A100. In addition, the NFC function is in the "enabled" state, and the wireless LAN function is in the "disabled" state.

At step S501, the control unit B101 of the smartphone B100 determines whether the proximity wireless communication unit A112 has been detected or not. When the user brings the smartphone B100 into the proximity of the digital camera A100, the control unit B101 detects a detection signal from the proximity wireless communication unit B112 to the proximity wireless communication unit A112. Therefore, the determination at step S501 is made by determining whether the control unit B101 has detected the detection signal or not. When the control unit B101 detects the detection signal, the processing moves to step S502.

At step S502, the control unit B101 performs an operation for reading information from the proximity wireless communication non-volatile memory A123 via the proximity wireless communication unit A112 of the digital camera A100. The information read in this stage is a wireless parameter including the SSID required for establishing wireless LAN connection, an encryption key, etc.

At step S503, the control unit B101 determines whether it has completed the reading of the wireless parameter from the proximity wireless communication non-volatile memory A123 of the digital camera A100. This determination is made based on a response from the proximity wireless communication unit A112 of the digital camera A100. The control unit B101 continues the operation for reading at step S502 until completion of the reading. Upon completion of the reading, the control unit B101 temporarily stores the information read from the proximity wireless communication non-volatile memory A123 into the work memory B104. After that, the processing moves to step S520.

At step S520, the control unit B101 determines whether the information read from the proximity wireless communication non-volatile memory A123 is normal or not. For example, a CRC code has been added to the information (data) read via NFC communication, and the control unit B101 can determine whether the read information includes a bit error or not, based on the CRC code. When the control unit B101 determines that the information read from the proximity wireless communication non-volatile memory A123 is not normal, the processing shown in this flowchart ends. Otherwise, the processing moves to step S504.

At step S504, by using the proximity wireless communication unit B112, the control unit B101 provides the proximity wireless communication unit A112 of the digital camera A100 with the parameter acquisition completion notification. The parameter acquisition completion notification indicates that the acquisition of the wireless parameter has been normally completed. The proximity wireless communication unit A112 of the digital camera A100 provides the interruption notification to the first control unit A101 in response to the parameter acquisition completion notification from the proximity wireless communication unit B112 (See step S402 in FIG. 4).

At step S505, the control unit B101 waits until the receipt of a response to the parameter acquisition completion notification. Upon receipt of the response, the control unit B101 activates a wireless LAN at step S506. The wireless parameter used in this stage is the wireless parameter read from the proximity wireless communication non-volatile memory A123 at step S502 and temporarily stored in the work memory B104.

At step S507, the control unit B101 determines whether wireless LAN connection with the digital camera A100 has been established or not. Since the smartphone B100 has acquired via NFC communication the same wireless parameter as the digital camera A100, it is likely that the wireless LAN connection will be normally established. However, there is the possibility that the digital camera A100 does not activate a wireless LAN, for example for the reason that during the provision of the parameter acquisition completion notification at step S504, the data has been altered and contains an error due to a communication failure. When the wireless LAN connection is not established, the control unit B101 determines at step S512 whether a predetermined period has elapsed or not. When the control unit B101 determines that the predetermined period has not elapsed, the processing returns to step S507. In the case where the wireless LAN connection is not established when the predetermined period has elapsed, the control unit B101 determines that the digital camera A100 temporarily cannot activate a wireless LAN, and terminates the wireless LAN operation at step S511.

When the wireless LAN connection is established at step S507, the control unit B101, at step S508, starts wireless LAN communication with the digital camera A100. According to the present embodiment, the control unit B101 of the smartphone B100 notifies the digital camera A100 of the operation mode at the beginning of the wireless LAN communication performed at step S508.

At step S509, the control unit B101 determines whether to end the wireless LAN communication or not. The control unit B101 continues the wireless LAN communication at step S508 until it determines to end the wireless LAN communication. When ending the wireless LAN communication, the control unit B101, at step S510, transmits the wireless LAN communication end notification to the digital camera A100. For example, when an operation for ending the application is selected on the operation unit B105 by the user, the control unit B101 determines to end the wireless LAN communication. The wireless LAN communication end notification transmitted in this stage is detected by the first control unit A101 of the digital camera A100, as the remote shooting (playback) mode end notification (See Steps S412 and S414 in FIG. 4).

At step S511, the control unit B101 disconnects the wireless LAN. By this operation, both the digital camera A100 and the smartphone B100 can normally end the wireless LAN communication.

Figure 6A:
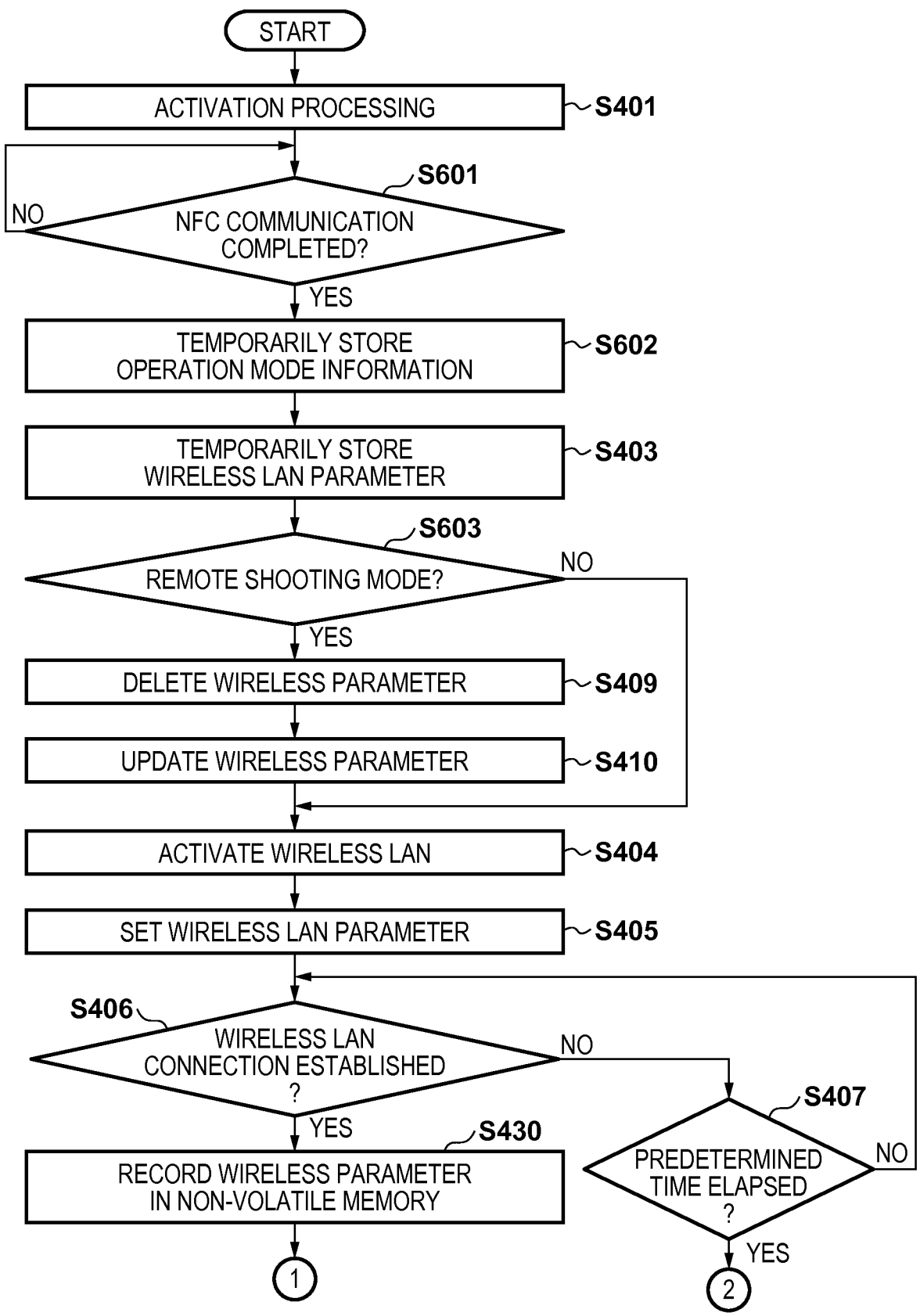
FIGS. 6A and 6B are flowcharts showing a modification example of FIG. 4.
Figure 6B:
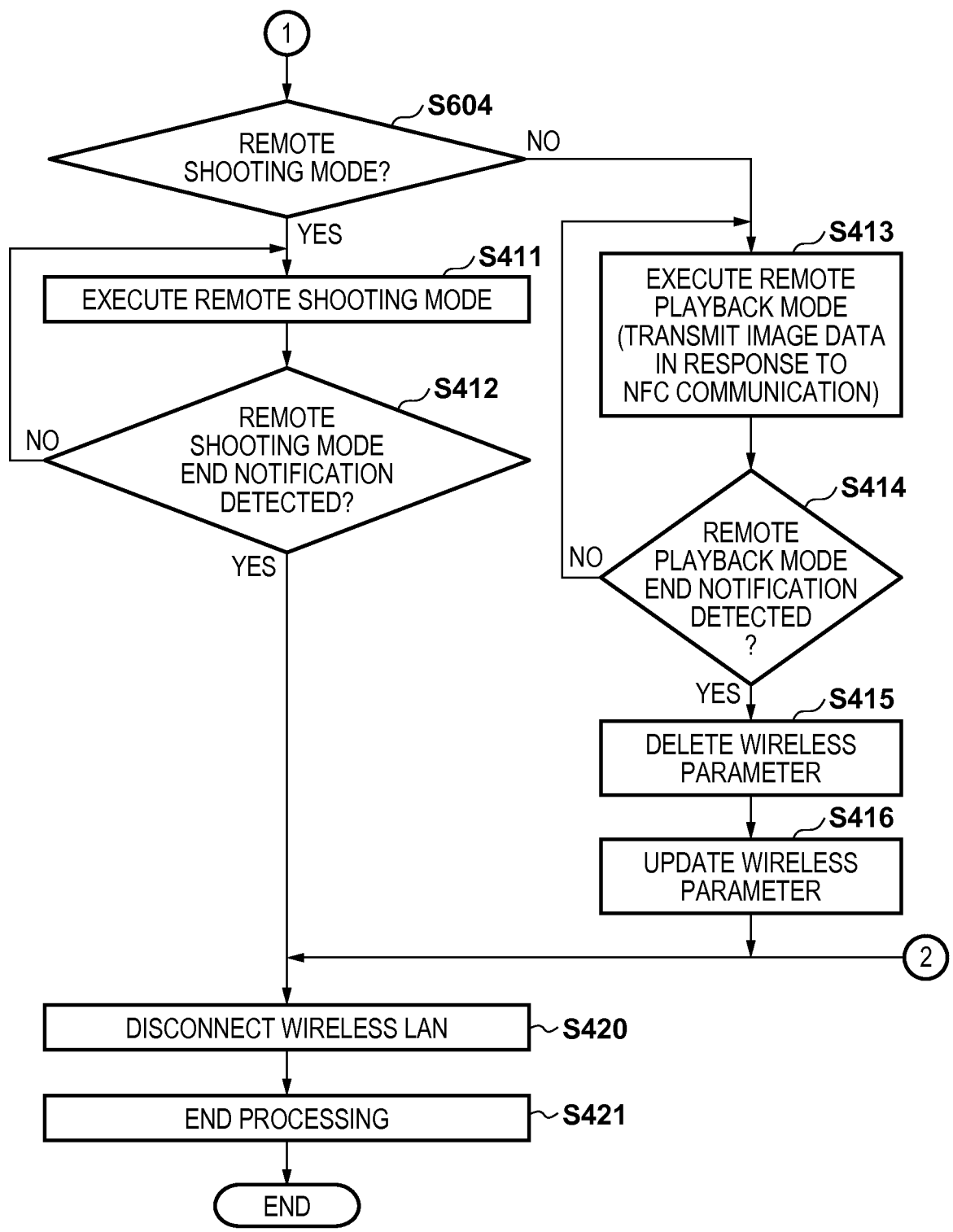

In the description above, it is assumed that the control unit B101 notifies the digital camera A100 of the operation mode at the beginning of the wireless LAN communication at step S508. However, at step S504, via NFC communication, the control unit B101 may provide the digital camera A100 with information of the operation mode together with the parameter acquisition completion notification. The operations of the digital camera A100 in this case is described next with reference to FIGS. 6A and 6B. In FIGS. 6A and 6B, the same reference signs are provided for the steps for performing the same or similar processing as in FIG. 4.

At step S601, as at step S402 in FIG. 4, the first control unit A101 waits until it detects the completion of NFC communication with the smartphone B100. When NFC communication is performed, the first control unit A101 receives a notification of the operation mode from the smartphone B100 via the proximity wireless communication unit A112. At step S602, the first control unit A101 temporarily stores into the work memory A104 the information (operation mode information) indicating the operation mode notified at step S601. At step S603, the first control unit A101 determines whether or not the operation mode information temporarily stored at step S602 indicates the remote shooting mode. When the first control unit A101 determines that the operation mode information indicates the remote shooting mode, the processing moves to step S409, and otherwise the processing moves to step S404.

The processing at step S409 and the processing at the next step S410 in FIG. 6A are the same as the processing at steps S409 and S410 in FIG. 4. However, as can be seen from the comparison between FIG. 4 and FIGS. 6A and 6B, the timing with which the processing is performed is different.

At step S604, as at step S408 in FIG. 4, the first control unit A101 starts wireless LAN communication with the smartphone B100, and determines whether or not the operation mode is the remote shooting mode. However, unlike in S408 in FIG. 4, the notification of the operation mode is not provided in this stage. Instead, the first control unit A101 makes a determination as to whether or not the operation mode is the remote shooting mode, based on the operation mode information temporarily stored at step S602.

According to the operations shown in FIG. 6A, when the operation mode is the remote shooting mode, the digital camera A100 updates the wireless parameter at an earlier timing than in the case of the operations shown in FIG. 4. Therefore, the possibility that another smartphone acquires the same wireless parameter before the wireless LAN communication starts between the digital camera A100 and the smartphone B100 is reduced, and thus the security is improved. Also, according to the operations shown in FIG. 6A, the digital camera A100 can know the operation mode at an earlier timing than in the case of the operations shown in FIG. 4, the operation mode can be changed before the wireless LAN communication starts. Therefore, when the notified operation mode is the remote shooting mode for example, the digital camera A100 has already been switched to the remote shooting mode when the wireless LAN communication starts, and hence the user can perform the shooting operation immediately after the wireless LAN communication starts.

In the above description of the present embodiment, the connection unit A111 and the connection unit B111 perform wireless LAN communication. However, the present embodiment can be implemented even when the wireless LAN communication is replaced with the IEEE 802.15 standard (so-called Bluetooth (registered trademark)). If this is the case, the parameter exchanged in the proximity wireless communication via the proximity wireless communication unit A112 and the proximity wireless communication unit B112 is replaced with a parameter for Bluetooth (registered trademark).

As described above, according to the second embodiment, the digital camera A100 determines whether or not to update the wireless parameter in the proximity wireless communication non-volatile memory A123 depending on the operation mode at the time of wireless LAN communication. This operation improves the security in the case of one-to-one connection, while allowing for one-to-many connection as well.

Other Embodiments

In the above-described embodiments, a description is given to an example of recording a stew communication parameter into the proximity wireless communication non-volatile memory A123 by performing the processing at step S410 after performing processing at step S409 shown in FIG. 4. However, it is acceptable that only the deletion of the communication parameter at step S409 is performed in this stage, and step S410 may be performed at another timing. For example, the recording of a new communication parameter at step S410 may be performed at the timing of reception of the mote shooting mode end notification at step S412, that is, the timing of ending the service of communication with the smartphone B100 (immediately before or after the end of the service). Alternatively, the recording of the new communication parameter at step S410 may be performed at the timing when the wireless LAN is disconnected at step S420 (immediately before or after the disconnection of the wireless LAN). The same applies to steps S415 and S416 in FIG. 4.

Similarly, at step S240 in FIG. 2B, the request may be a request for deletion, not rewriting, and the recording of the new communication parameter may be performed at a different timing. For example, the recording of the new communication parameter may be performed at the timing of ending the communication processing at step S231, or at the timing the wireless LAN is disconnected.

In addition, regarding the deletion described above, it is also acceptable to perform updating the data to be dummy data for example, and perform the recording of the new communication parameter later on.

Also, in the above-described embodiments, an example of performing the processing at step S409 in FIG. 6A before the activation of the connection unit A111 (step S404) is described. Regarding this point, the processing at step S409 may be performed before the completion of the wireless LAN connection with the smartphone B100 at step S406. Alternatively, the processing at step S409 may be performed before the execution of the remote shooting mode at step S411. Even in these cases, the security is ensured at least at the timing when the digital camera A100 and the smartphone B100 exchange data (i.e., the timing when step S411 is performed). The same applies to FIG. 2B.

In the second embodiment above, it is stated that a plurality of smartphones can connect to the digital camera A100. Regarding this point, in reality, there is a limitation on the number of smartphones that can connect to the digital camera A100 at the same time. Therefore, it is acceptable to count the number of smartphones that are currently connecting to the digital camera A100 via a wireless LAN and delete or update the communication parameter in the proximity wireless communication non-volatile memory A123 when the limit is reached. In addition, if connection with any of the smartphones is terminated after the communication parameter is deleted or updated as the limitation is once reached, the communication parameter that is currently in use may be recorded in the proximity wireless communication non-volatile memory A123 again. In other words, the communication parameter in the proximity wireless communication non-volatile memory A123 may be switched between the enabled state and the disabled state depending on the number of the smartphone that are currently connected.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135168, filed Jun. 30, 2014, which is hereby incorporated by reference herein in its entirety.

What is claimed is:

1. A communication apparatus comprising:
a first communication interface that includes a controller and a non-volatile memory holding a first communication parameter, wherein the first communication interface is capable of wirelessly receiving power and operable with the wirelessly received power;
a second communication interface; and
at least one processor or circuit configured to perform the operations of a control unit,
wherein the first communication interface transmits the first communication parameter to an external apparatus in response to receiving a read request from the external apparatus,
wherein, in a case where the first communication interface transmits the first communication parameter to the external apparatus, the control unit reads out the first communication parameter from the non-volatile memory and instructs the controller to put the first communication parameter in the non-volatile memory in a state in which it cannot be transmitted via the first communication interface,
wherein, after the controller puts the first communication parameter in the non-volatile memory in a state in which it cannot be transmitted via the first communication interface, the control unit controls the second communication interface to broadcast a beacon including the first communication parameter that the first communication interface has transmitted to the external apparatus, and
wherein the second communication interface establishes a connection with the external apparatus after the beacon is broadcasted.

2. The communication apparatus according to claim 1, wherein, after the control unit reads out the first communication parameter, the control unit stores the first communication parameter in another memory that is not connected with the controller directly.

3. The communication apparatus according to claim 2, wherein, the controller puts the first communication parameter in a state in which it cannot be transmitted via the first communication interface by deleting the first communication parameter in the non-volatile memory.

4. The communication apparatus according to claim 1, wherein the controller puts the first communication parameter in a state in which it cannot be transmitted via the first communication interface by updating the first communication parameter in the non-volatile memory.

5. The communication apparatus according to claim 1, wherein the control unit reads out the first communication parameter from the non-volatile memory and instructs the controller to put the first communication parameter in the non-volatile memory in a state in which it cannot be transmitted via the first communication interface, in response to receiving a write request from the external apparatus.

6. The communication apparatus according to claim 1, wherein the second communication interface waits for a join request from the external apparatus after the beacon is broadcasted.

7. The communication apparatus according to claim 1, further comprising an image capturing unit,
wherein the control unit controls the second communication interface so that the second communication interface transmits image data generated by the image capturing unit to the external apparatus.

8. The communication apparatus according to claim 1, wherein the control unit determines whether or not to put the first communication parameter a state in which it cannot be transmitted via the first communication interface depending on a service performed through communication by the second communication interface with the external apparatus.

9. A method for controlling a communication apparatus, the communication apparatus comprising:
a first communication interface that includes a controller and a non-volatile memory holding a first communication parameter, wherein the first communication interface capable of wirelessly receiving power and operable with the wirelessly received power; and
a second communication interface,
the method comprising
transmitting, by the first communication interface, the first communication parameter to an external apparatus in response to receiving a read request from the external apparatus;
in a case where the first communication interface transmits the first communication parameter to the external apparatus, reading out the first communication parameter from the non-volatile memory and instructing the controller to put the first communication parameter in the non-volatile memory in a state in which it cannot be transmitted via the first communication interface; and
after the controller puts the first communication parameter in the non-volatile memory in a state in which it cannot be transmitted via the first communication interface, controlling the second communication interface to broadcast a beacon including the first communication parameter that the first communication interface has transmitted to the external apparatus,
wherein a connection with the external apparatus is established by the second communication interface after the beacon is broadcasted.

10. A non-transitory computer-readable storage medium which stores a program for causing a computer to execute a method for controlling a communication apparatus,
the communication apparatus comprising:
a first communication interface that includes a controller and a non-volatile memory holding a first communication parameter, wherein the first communication interface is capable of wirelessly receiving power and operable with the wirelessly received power; and
a second communication interface,
the method comprising
transmitting, by the first communication interface, the first communication parameter to an external apparatus in response to receiving a read request from the external apparatus;
in a case where the first communication interface transmits the first communication parameter to the external apparatus, reading out the first communication parameter from the non-volatile memory and instructing the controller to put the first communication parameter in the non-volatile memory in a state in which it cannot be transmitted via the first communication interface; and
after the controller puts the first communication parameter in the non-volatile memory in a state in which it cannot be transmitted via the first communication interface, controlling the second communication interface to broadcast a beacon including the first communication parameter that the first communication interface has transmitted to the external apparatus,
wherein a connection with the external apparatus is established by the second communication interface after the beacon is broadcasted.

11. A communication apparatus comprising:
a first communication interface that includes a controller and a non-volatile memory holding a first communication parameter;
a second communication interface;
at least one processor or circuit configured to perform the operations of a control unit that is connected with another memory;
wherein, in a case where the first communication interface transmits the first communication parameter to the external apparatus, the control unit copies the first communication parameter from the non-volatile memory to the another memory and instructs the controller to put the first communication parameter in the non-volatile memory in a state in which it cannot be transmitted via the first communication interface,
wherein, after the controller puts the first communication parameter in the non-volatile memory in a state in which it cannot be transmitted via the first communication interface, the control unit controls the second communication interface to broadcast a beacon including the first communication parameter that the first communication interface has transmitted to the external apparatus,
wherein the second communication interface establishes a connection with the external apparatus after the beacon is broadcasted.

12. A method for controlling a communication apparatus, the communication apparatus comprising:
a first communication interface that includes a controller and a non-volatile memory holding a first communication parameter;
a second communication interface;
the method comprising:
in a case where the first communication interface transmits the first communication parameter to the external apparatus, copying the first communication parameter from the non-volatile memory to the another memory and instructing the controller to put the first communication parameter in the non-volatile memory in a state in which it cannot be transmitted via the first communication interface,
after the controller puts the first communication parameter in the non-volatile memory in a state in which it cannot be transmitted via the first communication interface, controlling the second communication interface to broadcast a beacon including the first communication parameter that the first communication interface has transmitted to the external apparatus,
wherein a connection with the external apparatus s established by the second communication interface after the beacon is broadcasted.

13. A non-transitory computer-readable storage medium which stores a program for causing a computer to execute a method for controlling a communication apparatus, the communication apparatus comprising:
a first communication interface that includes a controller and a non-volatile memory holding a first communication parameter;
a second communication interface;
the method comprising:
in a case where the first communication interface transmits the first communication parameter to the external apparatus, copying the first communication parameter from the non-volatile memory to the another memory and instructing the controller to put the first communication parameter in the non-volatile memory in a state in which it cannot be transmitted via the first communication interface,
after the controller puts the first communication parameter in the nonvolatile memory in a state in which it cannot be transmitted via the first communication interface, controlling the second communication interface to broadcast a beacon including the first communication parameter that the first communication interface has transmitted to the external apparatus,
wherein a connection with the external apparatus is established by the second communication interface after the beacon is broadcasted.

* * * * *